United States Patent Office 2,788,346
Patented Apr. 9, 1957

2,788,346
PROCESS OF PREPARING OROTIDINE

Herschel K. Mitchell, Pasadena, Calif., and Adolf M. Michelson, Cambridge, England, assignors to California Institute Research Foundation, Pasadena, Calif., a corporation of California No Drawing. Application June 27, 1952,
Serial No. 296,075

6 Claims. (Cl. 260—211.5)

This invention relates to a novel chemical compound, and to processes of preparing the same. More particularly, it is concerned with a new glycoside of orotic acid, and to a method of obtaining this glycoside.

The results of a number of experimental studies have indicated that the pyrimidine orotic acid is an important substance in biological systems. Thus, it has been found, as a result of investigations using mutants of the fungus Neurospora, that orotic acid has a significant role in the biological synthesis of the ribose nucleosides uridine and cytidine. Further, by the use of isotopically labelled orotic acid it has been demonstrated that a similar conclusion may be drawn concerning a function of this pyrimidine in the biological synthesis of nucleic acids in animal tests. In addition, tests with the organism L. bulgaricus have indicated a more specific biochemical activity of orotic acid. However, results of our early work with Neurospora mutants suggest that the primary route of biological synthesis of uridine in the mold consists of the building of the pyrimidine compound stepwise onto the carbohydrate rather than of a direct coupling of ribose and uracil. Accordingly, it has been of considerable interest to prepare glycoside derivatives of orotic acid since it is postulated that such products would be of great value as intermediates in the biological synthesis of nucleic acids.

It is one object of the present invention to provide a novel glycoside derivative of orotic acid. It is a further object to provide a method for the preparation of this new glycoside compound. Other objects will be apparent from the detailed description hereinafter provided.

In accordance with our invention, we have now found that a glycoside of orotic acid, herein termed orotidine, is produced and accumulates in the mycelium when pyrimidineless mutants of *Neurospora crassa* are grown in aqueous nutrient mediums. Further, we have found that the orotidine may be readily recovered from the mycelium.

It had been previously found that pyrimidineless mutants of Neurospora growing in suitable aqueous nutrient mediums accumulate large quantities of orotic acid in the broth. In the production of orotic acid, these mutants require the presence of a pyrimidine in the fermentation medium in addition to the usual nutrient salts. Pyrimidines that are suitable for satisfying the growth requirements of some pyrimidineless mutants that may be mentioned include uridine, cytidine and uracil.

When pyrimidineless mutants of the mold *Neurospora crassa* are grown on a minimal fermentation medium in the presence of uridine, cytidine or uracil, it is found that orotidine is produced and accumulated in the mycelium of the fungus. For example, orotidine is produced by fermenting a medium containing sucrose, potassium tartrate, potassium nitrate, and other nutrient salts supplemented with cytidine. The fermentation is preferably carried out under submerged conditions with agitation and forced aeration at a temperature of about 25° C. Under these conditions, we find that maximum yields are obtained with an incubation period of from about 4 to 7 days. Other carbohydrates such as starch, glucose, maltose and dextrose will also support the growth of Neurospora molds. Corn steep liquor, yeast extract, or liver extract, are also suitable for supporting the growth of these Neurospora mutants.

At the conclusion of the incubation period, the mycelium is separated from the fermentation broth and the orotidine is recovered from the mycelium. In the first step of this recovery process, the mycelium is suspended in an aqueous solution of a suitable solvent for orotidine, such as a lower aliphatic alcohol, and the resulting suspension is warmed and then permitted to stand at room temperature for about 10 to 12 hours after which the liquid extract is recovered by filtration. The resulting filtrate is adjusted to a pH of about 8.5 with alkali after which it is filtered and evaporated to a small volume under diminished pressure. The orotidine is then precipitated from the concentrated solution as the lead salt by the addition of a soluble lead salt. The precipitated orotidine salt is conveniently recovered by centrifuging and may then be decomposed by treating an aqueous suspension of the lead salt with hydrogen sulfide. After removing the precipitated lead sulfide, an aqueous solution of orotidine is obtained.

The aqueous solution of orotidine so obtained can be evaporated to obtain the desired product. Usually, however, we find it desirable to further purify the product by fractionation in a chromatopile. After the aqueous solution of orotidine has been adsorbed on the paper chromatopile, the column is developed by the addition of a suitable solvent such as an aqueous solution of a lower aliphatic alcohol. We prefer to use a solvent mixture consisting of about 3 parts of propanol and 1 part of water as the developing solvent, although other solvents may also be employed for this purpose. The orotidine containing segment of the chromatopile is conveniently located by determining the absorption spectra of the adsorbed material at various levels. Orotidine has a very characteristic absorption maximum at about 265 mu which serves to clearly distinguish the product from the impurities associated therewith. The segment of the chromatopile containing the desired product is then extracted with a suitable solvent for orotidine such as hot water, a lower aliphatic alcohol, or an aqueous solution of a lower aliphatic alcohol.

The solution of orotidine recovered from the chromatopile can be evaporated to obtain the free acid form of orotidine. Alternatively, the orotidine can be reacted with an organic or inorganic base to form the corresponding salt of orotidine which can be recovered by evaporation of the solvent. We have found it most convenient to recover the orotidine as the cyclohexylamine salt which is readily obtained in crystalline form. Thus, the cyclohexylamine salt of orotidine is prepared by adding the required amount of cyclohexylamine to the solution of orotidine and evaporating the solvent to obtain the cyclohexylamine salt in the form of a syrup. This syrup is then crystallized from a suitable solvent such as a mixture of ethanol and benzene. The cyclohexylamine salt can be decomposed by reaction with acids to obtain the free acid form of orotidine.

The aqueous solution of the orotidine obtained by the decomposition of the lead salt obtained in the above-described process can also be purified by adsorbing the orotidine on activated charcoal and eluting it with an aqueous solution of a base. Suitable bases for effecting this elution that might be mentioned are organic bases such as pyridine, cyclohexylamine, and the like, and the inorganic bases such as sodium hydroxide, potassium hydroxide, sodium carbonate, and the like.

From experimental evidence described hereinafter, it would appear that orotidine is a riboside derivative of orotic acid although further work would be required to make the identification unequivocal. Also, it is not known at present how the pentose portion is attached to the orotic acid moiety of orotidine. In view of the foregoing, it should, of course, be understood that subsequent experimentation may, in fact, establish that the composition of orotidine is different than is indicated by the early experimental results described herein.

The following example is presented to illustrate specific embodiments of our invention:

Example

A nutrient medium was prepared having the following composition:

| | |
|---|---|
| Sucrose | percent 1.5 |
| Potassium tartrate | do 0.6 |
| $KNO_3$ | do 0.3 |
| $KH_2PO_4$ | do 0.1 |
| $MgSO_4$ | do 0.05 |
| $CaCl_2$ | do 0.01 |
| NaCl | do 0.01 |
| Cytidine sulfate | mg./liter 10 |
| $MnSO_4 \cdot 4H_2O$ | do 10 |
| $FeSO_4 \cdot 7H_2O$ | do 10 |
| $ZnSO_4$ | do 1 |
| $CuSO_4 \cdot 7H_2O$ | do 0.25 |
| Biotin | micrograms/liter 5 |

35 liters of the sterilized medium was aseptically inoculated with a conidial growth of the mutant strain of *Neurospora crassa*. A culture of this strain of *Neurospora crassa* has been deposited with and is available from the permanent collection of microorganisms of the American Type Culture Collection, Washington, D. C., where it is identified as ATCC 12623. The fermentation medium was then incubated for 4½ days under submerged conditions with agitation and forced aeration at 25° C. The mycelium was separated from the broth by filtering through cheese cloth, washed with 500 ml. of distilled water, and the water squeezed out thoroughly by hand.

The moist mold was chopped into small pieces, suspended in 100 ml. of water and 200 ml. of 95% ethanol and macerated for 10 minutes in a Waring blender. The resulting slurry was heated at 80° C. for 30 minutes and allowed to stand at room temperature overnight. After filtering the residual mycelium was washed with 200 ml. of hot 50% ethanol. 5 g. of barium acetate was added to the filtrate and the solution adjusted to pH 8.5 with barium hydroxide. The resulting precipitate was removed and washed by centrifugation. The supernatant solution containing the glycoside was evaporated under reduced pressure to a final volume of 500 ml. The orotidine was then precipitated by addition of a saturated solution of lead subacetate. The precipitate was centrifuged, washed with water, suspended in 100 ml. of water and decomposed with $H_2S$. The lead sulfide precipitate was removed by filtration. The resulting filtrate containing orotidine of approximately 60% purity was purified further by fractionate in a chromatopile, using 12.5 cm. S & S filter paper (No. 598) and a developing solvent composed of 3 parts of propanol to 1 part of water. After location of the riboside by absorption spectra measurements, the substance was extracted from the paper with hot water. An aliquot of the resulting solution (containing 200 mg. of orotidine) was evaporated in vacuo in the presence of 500 mg. of cyclohexylamine. The resulting syrup was dissolved in 3 ml. of ethanol, and 10 ml. of benzene was then added. After standing for two days at 5° C. the white crystalline product (210 mg.) was filtered and air dried. The salt was recrystallized from 10 ml. of hot 95% ethanol plus enough benzene to produce a slightly turbid solution. The product was dried over $P_2O_5$ at 60° C. and melted at 183–184° C.

The recrystallized cyclohexylamine salt of orotidine gave the following analyses:

$C_{16}H_{25}N_3O_8$: Calculated percent.—C, 49.66; H, 6.52; N, 10.85. Found percent.—C, 49.54; H, 6.68; N, 11.09.

Pentose (orcinol): Calculated percent.—38.8. Found percent.—38.7, 38.6, 38.5.

In order to identify the degradation products, a sample of the cyclohexylamine salt (120 mg.) was heated at 100° C. for one hour with 2.5 ml. of 1 N $H_2SO_4$. After the solution was allowed to cool, the crystalline precipitate of orotic acid monohydrate was centrifuged, washed 3 times with distilled water (1 ml. each time) and dried at room temperature over $CaCl_2$. The product (47 mg., 85% yield) was recrystallized from boiling water and dried over $P_2O_5$ at 100° C. This product gave the following analyses: Found percent.—C, 38.53; H, 2.74. Calculated percent for $C_5H_4N_2O_4$:—C, 38.48; H, 2.56. M. P. 343–344° C. The product was identical with a known sample of orotic acid with respect to absorption spectra in acid and alkali and to movement on paper chromatograms in several solvents.

The supernatant solution from the orotic acid isolation was utilized for experiments on paper chromatography of the sugar component. Using Whatman No. 1 paper and a solvent mixture of 5 parts of propanol to 1 part of 1% $NH_4OH$ the unknown sugar gave an Rf value of 0.33±0.01. Known sugars tested simultaneously gave the following RF values: Ribose, 0.33; xylose, 0.29; arabinose, 0.26; glucose, 0.19; galactose, 0.18; mannose, 0.23. Mixing the unknown with the known sugars did not affect the Rf values found. Similar results were obtained by chromatography in other solvents. Benzidine and naphthoresorcinol reagents were used to locate the sugars on the paper. Typical pentose reactions were given by the unknown sugar.

Confirmation of the identity of the pentose component was obtained by applying the method of Ikawa and Niemann, J. Biol. Chem. 180, 923 (1949). Absorption spectra obtained after heating a known mixture of ribose and orotic acid in 80% $H_2SO_4$ for 30 minutes were found to be identical with spectra obtained from an equivalent quantity of cyclohexylamine riboside after the same treatment. The orotic acid is nearly destroyed by the treatment and does not seriously interfere with the determination.

Various changes and modifications may be made in carrying out the present invention without departing from the spirit and scope thereof. Insofar as these changes and modifications are within the purview of the annexed claims, they are to be considered as part of this invention.

We claim:

1. A process for the production of orotidine which comprises growing a pyrimidineless mutant of *Neurospora crassa* in an aqueous nutrient medium containing a pyrimidine under submerged aerobic growth conditions, separating the mycelium from the resulting fermentation broth, and recovering orotidine from the mycelium.

2. A process as claimed in claim 1, wherein the recovery of orotidine from the mycelium includes the step of extracting said mycelium with a solvent for orotidine.

3. A process for the production of orotidine which comprises growing a pyrimidineless mutant of *Neurospora crassa* in an aqueous nutrient medium containing a pyrimidine under submerged aerobic growth conditions at a temperature of about 25° C. for a period of about 4 to 7 days, separating the mycelium from the resulting fermentation broth, and recovering orotidine from the resulting mycelium.

4. A process for the production of orotidine which comprises growing a pyrimidineless mutant of *Neuro-*

*spora crassa* in an aqueous nutrient medium containing sucrose, potassium tartrate, potassium nitrate, other nutrient salts, biotin, and a compound from the group consisting of cytidine, uridine, and uracil under submerged aerobic growth conditions, separating the mycelium from the resulting fermentation broth, and recovering orotidine from the mycelium.

5. A process for recovering orotidine from mycelium obtained by growing a pyrimidineless mutant of *Neurospora crassa* in an aqueous nutrient medium containing a pyrimidine which comprises extracting said mycelium with a solvent for orotidine, and recovering orotidine from the resulting extract.

6. A process for recovering orotidine from mycelium obtained by growing a pyrimidineless mutant of *Neurospora crassa* in an aqueous nutrient medium containing a pyrimidine which comprises intimately contacting said mycelium with ethanol, removing the insoluble portion, adjusting the pH of the resulting extract with alkali to about 8.5 and concentrating said extract to a small volume, precipitating orotidine as the lead salt, decomposing said lead salt of orotidine, and reacting the orotidine with cyclohexylamine to form the cyclohexyl amine salt of orotidine.

References Cited in the file of this patent

Loring et al.; C. A., 38, 3312 (1944).
Mitchell et al.: C. A., 42, 3808 (1948).
Pierce et al.: C. A., 42, 246 (1948).
C. A. V. 46, p. 9156 4 (1952), citing Michelson et al. Proc. Nat'l. Acad. Science U. S., v. 37, p. 396–9 (July 1951).